Feb. 7, 1961 A. MACOVSKI 2,971,046

SYNCHRONOUS COLOR KILLER

Filed Oct. 19, 1955 2 Sheets-Sheet 1

INVENTOR.
Albert Macovski
BY
[signature]
ATTORNEY

SYNCHRONOUS COLOR KILLER

Filed Oct. 19, 1955 2 Sheets-Sheet 2

INVENTOR.
Albert Macovski
BY
[signature]
ATTORNEY

United States Patent Office 2,971,046

Patented Feb. 7, 1961

2,971,046

SYNCHRONOUS COLOR KILLER

Albert Macovski, Massapequa, N.Y., assignor to Radio Corporation of America, a corporation of Delaware Filed Oct. 19, 1955, Ser. No. 541,349

17 Claims. (Cl. 178—5.4)

Figures 1, 2:
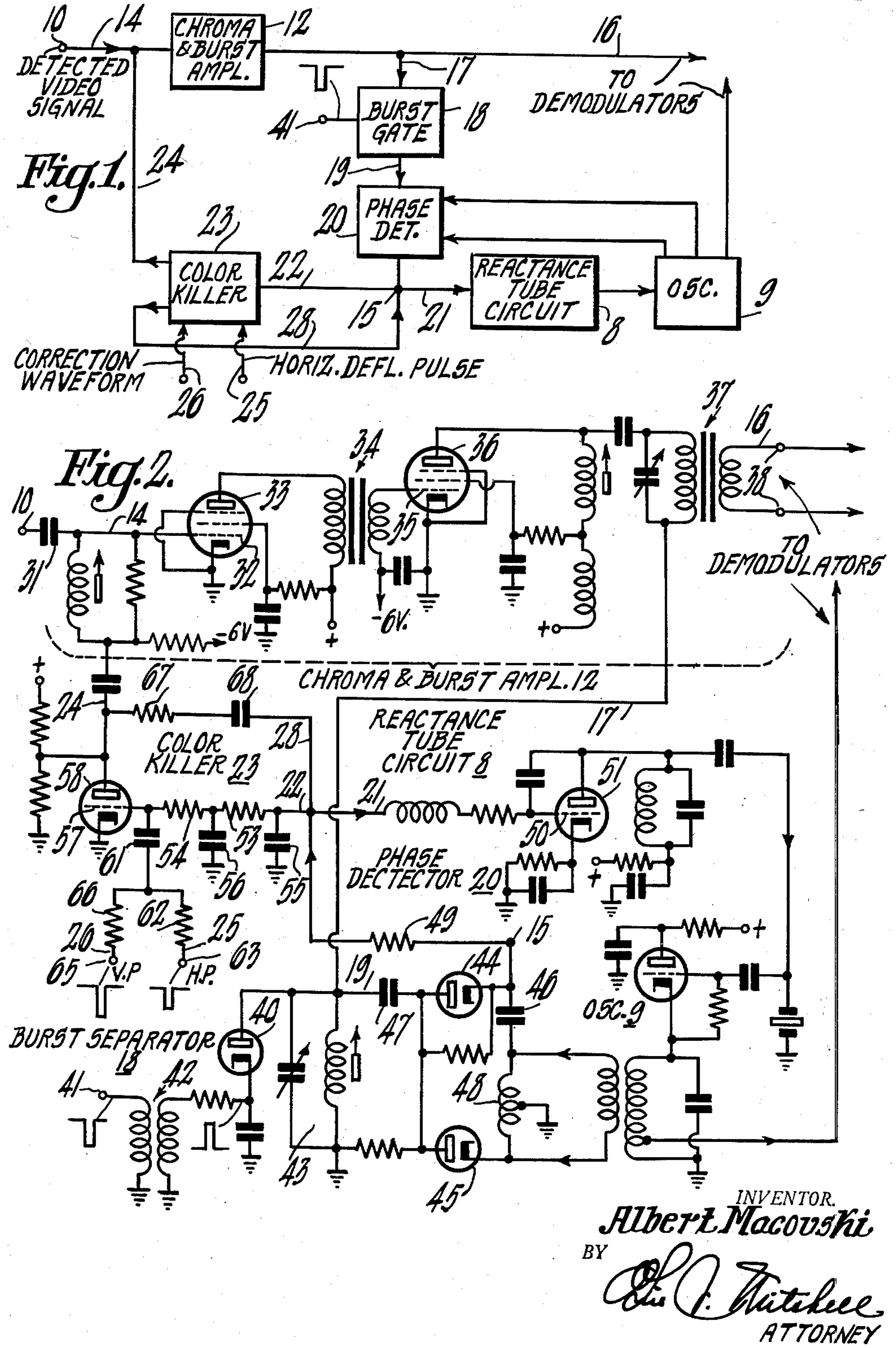
Figures 1, 2:
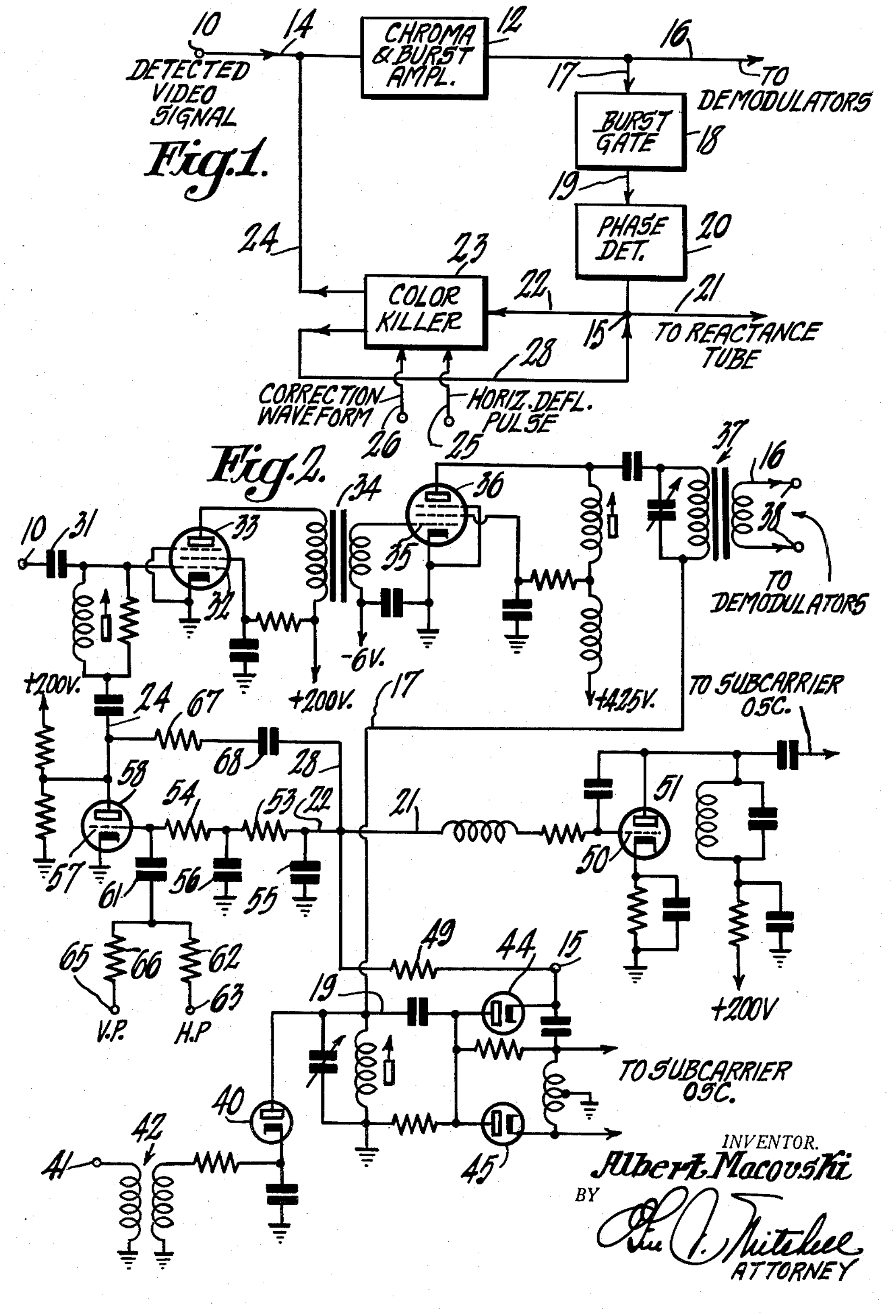

The present invention relates generally to circuits for automatically switching between two modes of operation and more particularly to means for providing color killer action in a color television receiving system.

In accordance with the color television standards adopted on December 17, 1953, a chrominance signal is transmitted as an amplitude and phase modulated color subcarrier wave having a frequency of 3.58 mcs. The color information present in the chrominance signal is susceptible to demodulation by the process of synchronous detection. Synchronous detection involves the heterodyning of the chrominance signal with a locally generated reference signal at a phase which is representative of the particular color difference signal being demodulated which may be referred to as the reference phase. In order to provide accurate reference phase signal information a burst of approximately eight cycles of a wave having a frequency of 3.58 mcs. is transmitted on the back porch of the horizontal synchronizing pulse and is used as a control signal to establish the reference phase angles for synchronous detection. The color synchronizing burst not only yields the reference phase which is essential for the demodulation of the color difference information but it is also indicative of the presence or absence of a color signal or a monochrome signal. In the case of a monochrome signal the color synchronizing burst will be absent. In the case of a color signal the color synchronizing burst will be present.

It has been known to use one side of a balanced phase detector as an A.M. detector to sense the presence of the burst signals and actuate a color killer in accordance with their presence or absence. With amplitude sensitive systems however, it is possible that extraneous signals may provide an incorrect indication of the presence or absence of synchronous information. The chrominance channel may be disabled when there is still useable information or the chrominance channel may be activated during a noisy monochrome transmission.

It is accordingly, an object of the present invention to provide a synchronous color killer circuit which is capable of effectively disabling the chrominance channel for all signals other than those capable of synchronizing the color reference oscillator.

It is another object of the present invention to provide a synchronous color killer circuit which is insensitive to amplitude variations and which provides a positive color killer action for signals incapable of synchronizing the color reference oscillator.

In accordance with the present invention a balanced phase detector is arranged to operate at other than quadrature and to provide a zero signal output in the presence of any non-synchronous signal independent of amplitude and an output signal for all synchronous signals at angles other than quadrature. The color killer voltage is therefore always zero when the color reference oscillator is not synchronized and is within a predetermined voltage range when the color reference oscillator is synchronizing.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a block diagram of a portion of the chrominance channel of a color television receiving system incorporating a color killer circuit in accordance with the present invention; and Figure 2 is a schematic circuit diagram of a portion of the chrominance channel of a color television receiving system illustrating a specific embodiment of the color killer circuit provided with in accordance with the present invention.

Referring now to the drawing and particularly to Figure 1 a detected video signal which has been transmitted in accordance with the present television standards is processed by conventional color television receiving circuits. The receiving circuits provide a chrominance signal which involves the frequency components bearing principally upon the chrominance information. The chrominance signal and the received color synchronizing burst is applied to an input terminal 10 for application to a chroma and burst amplifier 12 of the receiving system by means of the conductor 14. The amplified chrominance signal and burst signal which is derived from the output circuit of the chroma and burst amplifier 12 is applied by means of a conductor 16 to the color demodulator of the receiving system and by means of a conductor 17 to a burst gate 18. The burst gate is conventional and is operated at appropriate times by the application of keying pulses to pass only the burst signal. The separated burst signal is applied by means of a conductor 19 to a phase detector 20. Two polarities of a reference wave from a color reference oscillator 9 are also applied to the phase detector 20. The phase of the local oscillator output wave is compared to the phase of the incoming burst in order to derive an output control bias at the terminal 15 which is employed to maintain the proper phase relation between the locally generated color demodulating wave and the incoming burst.

In accordance with the present invention, the control bias which is derived as a result of this phase comparison between the locally generated wave and the incoming burst is zero in the presence of any non-synchronous signal and is other than zero for all synchronous signals at angles other than quadrature. This control bias is applied by means of a conductor 21 to a reactance tube circuit 8 to control the frequency of the color reference oscillator 9 and to bring the oscillator into cophasal relation with the burst. The control bias voltage at which the reactance tube circuit 8 adjusts the output of the oscillator to be cophasal with the color synchronizing bursts will not have a zero magnitude but will be a voltage of negative polarity. The control bias voltage developed by the phase detector 20 to be indicative of any deviation from cophasal or synchronous operation will have "sense" relative to the voltage representing cophasal operation; that is, for a deviation in one direction from synchronous operation, the control bias will increase in magnitude; for a deviation in the other direction from synchronous operation, the control bias will decrease in magnitude. The control bias is also applied by means of a conductor 22 to a color killer circuit 23. The color killer circuit 23 is arranged to control the bias level at the input of the chroma and burst amplifier 12 through a conductor 24 so that at such times that the control bias is zero the color killer 23 is effective to render the chroma and burst amplifier circuit 12 inoperative for signal translation.

The overall control of the chroma and burst amplifier 12 is essentially a feed-back circuit. Therefore, if after a period when no synchronizing burst signals have been applied, color signal transmission is resumed, means must be provided for rendering the system operative to pass the burst signals through the chroma and burst amplifier 12. With this provision the burst gate 18 and phase detector 20 may supply a suitable negative control voltage for rendering the color killer circuit 23 inoperative and to thereby render the chroma and burst amplifier 12 operative for processing the chrominance signal. This is accomplished by applying horizontal deflection pulses by means of the conductor 25 to the color killer circuit 23 to automatically turn the color killer circuit 23 off during predetermined periods thereby periodically determining whether or not the burst signal is available. It is found that the burst signal is available during the period when the horizontal deflection pulse is effective to re-establish signal translation to the chroma and burst amplifier 12 the chrominance channel assumes normal operation.

The system as just described requires that during the time when color signal transmission is resumed, the control bias applied to the reactance tube circuit must be of a sufficient magnitude to bring the reference oscillator into synchronism with the burst signal from the normal free-running rate of that oscillator. When the reference voltage at which the burst and the oscillator output are cophasal, is large, it is possible that in the presence of weak color signals this "pull-in" may be difficult. To alleviate this condition, a correction wave may be introduced into the reactance tube control circuit which sweeps the reference oscillator through the correct value for a time such that pull-in is assured. This correction wave should be transmitted through the color killer circuit 23 so that it will exist only during the presence of monochrome signals or such signals that are incapable of synchronizing the reference oscillator. The correction wave is illustrated in Figure 1 as being applied by means of a conductor 26 to the color killer circuit 23 and derived from the output of the color killer circuit 23 and applied by means of the conductor 28 to the conductor 21 for application to the reactance tube circuit.

The schematic circuit diagram shown in Figure 2 illustrates a specific embodiment of the present invention wherein the chrominance signal is impressed upon the input terminal 10 which is connected through a coupling capacitor 31 and the conductor 14 to the control electrode 32 of an amplifier device 33 which is utilized as the first chroma and burst amplifier. An output signal which is an amplified replica of the chrominance and burst signal is derived from the output circuit of the amplifier device 33 and coupled by means of a coupling transformer 34 to the control electrode 35 of a second amplifier device 36 used for further amplifying the chrominance signal and burst signal. The further amplified chrominance signal is derived from the anode circuit of the second amplifier device 36 and applied to the color demodulators of the associated receiving system by means of a coupling transformer 37 and a pair of output terminals 38 which are connected to the secondary winding of the coupling transformer 37. The remaining elements of the chrominance signal amplifier circuits which include the amplifier devices 33 and 36 are essentially of conventional design and are included to provide the appropriate mode of operation and the band width necessary for the processing of the chrominance signal. If full advantage is to be taken of the chrominance signal information the band width should be adjusted for a range of approximately 2 to 4.2 mcs.

The amplified chrominance signal and burst signal which is applied to the color demodulators by means of the coupling transformer 37 is applied simultaneously by means of the conductor 17 to the burst gate which includes a diode 40 and which is activated by a suitable gate pulse applied to a terminal 41 of a pulse transformer 42 so that the burst gate is open during the interval in which the burst signal is available in the output circuit of the second chrominance amplifier. By means of this gating action the burst signal is applied to the balanced phase detector comprising the diodes 44 and 45 to be compared with a signal received from the oscillator 9. The oscillator 9 is of a type described by Kirkwood and Torre in their paper, The CT100 Commercial Color Television Receiver, RCA Review, September 1954.

A more detailed explanation of the operation of the phase detector 20 of Figure 2 is presented as follows:

The color synchronizing bursts are developed across the resonant circuit 43, which is tuned to burst frequency, and applied therefrom to the anodes of the diodes 44 and 45 by way of condenser 47. Opposite phases of the output of the oscillator 9 are applied, respectively, to the cathodes of the diodes 44 and 45 by way of the coil 48. The diodes 44 and 45 and their associated circuits are connected to function as a pair of peak detectors which are connected in shunt. During one-half cycle of the output of the oscillator 9, diode 44 will develop across condenser 47 a voltage equal to the vector sum of the peak amplitude of the bursts plus one phase of the oscillator output. During the next half cycle, diode 45 will conduct and develop across condenser 46 a voltage equal to the vector sum of the peak amplitude of the bursts plus the opposite phase of the oscillator output.

The combined voltages contributed by the condensers 46 and 47 provide a resultant voltage wherein the contributions of voltage provided by the bursts add. The resultant voltage will have a magnitude which will be a function of both burst amplitude and also of the phase difference between the burst phase and the oscillator phase. Since the contributions of both peak detectors are algebraically added, the output voltage at terminal 15 is twice that value obtainable from a standard balanced phase detector.

It follows from the above that, when the bursts are not present, the output of the phase detector will be equal to zero, a condition required by the invention.

In order to provide the benefits of the invention, the phase detector 20 is operated in conjunction with the reactance tube circuit 8 and the oscillator 9 in a unique manner. The loop comprising the phase detector 20, the reactance tube circuit 8, and the oscillator 9 is designed to pull into synchronism when the burst phase is substantially equal to or in the vicinity of the oscillator phase, not when the burst and oscillator phases are in quadrature as is the case in standard automatic frequency control systems. As a result, the output of the phase detector 20, at phase lock or in a useable phase locking range, is a voltage of negative polarity. In an actual operating circuit, the phase-locking range was designed to correspond to voltages in the range of from −4 to −8 volts applied to the reactance tube with −6 volts corresponding to the point of phase lock. When no bursts are present, the output of the phase detector 20 is zero, and the color killer circuit becomes actuated.

As pointed out above, when no color synchronizing burst is received, voltage of zero amplitude is applied to the reactance tube circuit by the phase detector 20; this voltage is substantially outside of the normal locking range of −4 to −8 volts of the automatic frequency control system, and a received burst which was weak in signal strength would possibly not develop enough voltage at the output terminal 15 of the phase detector 20 to produce phase locking, and the oscillator would continue to be free-running even during color transmission. The correction wave, previously mentioned in connection with Figure 1 and which may take the form of a sawtooth wave voltage, then continually sweeps the control bias of the reactance tube circuit 8 at all times during other than color transmission so that when the color transmission is resumed, even with color synchronizing bursts of weak signal strength, the control bias of the reactance tube circuit 8 is swept through the phase-locking range wherein the bursts will produce phase-locking, previously referred to as "pull-in." Once "pull-in" occurs, the color killer circuit 23 will cease applying the sweeping control bias to the reactance tube circuit 8 and the phase detector will resume control of the phase and frequency of the oscillator 20.

As above noted, the operation of the balanced phase detector is selected to provide at the output terminal 15 a control bias having substantially zero magnitude in the presence of non-synchronous signals. That is to say, when the signals applied to the phase detector contain a color synchronizing burst of such a nature as to synchronize the reference oscillator, a control bias is developed at the output terminal 15 which is negative in polarity with respect to signal ground and which is effective to maintain the color killer circuit inoperative and which is further effective to control the reactance tube circuit in order to maintain cophasal operation. When the burst signal applied to the balanced phase detector by means of the gating operation does not contain a color synchronizing burst effective to provide cophasal operation of the reference oscillator, the control bias developed at the output terminal 15 becomes substantially zero thereby permitting the reference oscillator to operate at its natural free running frequency and further permitting the color killer circuit 23 to be operative to reduce the gain of the first chrominance signal amplifier to a point where the amplifier is inoperative for signal translation.

This control bias is applied through an isolating resistor 49 and an appropriate filter circuit to the control electrode 50 of an amplifier device 51 which is used as a reactance control device for the reference oscillator. At the same time, the control bias is applied through a filter circuit comprising the series resistors 53 and 54 and the shunt capacitors 55 and 56 to the control grid 57 of an amplifier device 58 which is used as the active element in the color killer circuit. Each of the amplifier devices 51 and 58 is adapted to operate in the presence of chrominance signal information including a burst signal with a control bias which may be in the order of six volts negative with respect to ground. In this condition the reactance tube is effective to lock the reference oscillator into cophasal operation with the received synchronizing burst. And, the control bias applied to the amplifier device 58 is sufficient under these conditions to render this device non-conducting. Therefore, the bias applied to the control electrode 32 of the first chrominance signal amplifier by means of the conductor 24 permits the chrominance signal amplifier to be fully responsive to the applied signals and to be effective for signal translation.

However, when the signals which are derived from the output circuit of the second chrominance signal amplifier circuit are of a non-synchronous nature, the control bias which is provided at the control electrode 57 is of a magnitude to permit the gain control device 58 to be conductive thereby applying to the control electrode 32 a negative bias which is sufficient to render the chrominance and burst amplifier 12 ineffective for signal translation. Since the control bias is applied simultaneously to each of the control electrodes 50 and 57, the operation of the reactance tube 51 does not, under these conditions, maintain the reference oscillator at the burst frequency of 3.58 mcs. since the reactance tube circuit 8 renders the oscillator 9 cophasal with respect to burst only for a substantially large voltage of negative polarity with respect to ground. The color killer circuit is essentially a feedback circuit. It therefore becomes necessary to provide a method and means for returning the chrominance signal amplifier to a normal signal translating condition at periodic intervals in order to sense the presence or absence of the color synchronizing bursts. This is accomplished by the application of a pulse wave to the control electrode 57 by means of a coupling capacitor 61 which is connected in series with an isolating resistor 62 between the control electrode 57 and an input terminal 63. These pulses are applied during the period when burst signals would appear in the received signal and may conveniently be horizontal deflection pulses of a sufficient amplitude and duration to periodically render the gain control device 58 ineffective to maintain the chrominance signal amplifier non-conductive for signal translation. The amplification and signal translation of any signal information which may be available at the input terminals 10 during this interval is therefore accomplished. If this signal information contains chrominance signals and color synchronizing burst a control bias is developed at the output terminal 15 of the balanced phase detector which effectively returns the chrominance channel to normal operation. However, if the signal information during this period is of a non-synchronous nature the control bias developed at the output terminal 15 remains substantially at zero or signal ground thereby permitting the gain control device 58 to remain conductive during the following interval between the horizontal deflection signals and therefore the chrominance signal amplifiers remain ineffective for signal translation during this period.

It may be found in certain instances that the overall sensitivity of the over-all receiver circuit is insufficient to provide a control bias at the output terminal 15 of a large enough magnitude to return the reference oscillator to a cophasal operation. This may be avoided by the introduction of a correction wave into the control electrode circuit of the reactance device 51 which sweeps the reference oscillator through the value of control bias at which cophasal operation is attained at periodic intervals so that cophasal operation may be assured. This correction wave should be applied to the control electrode 50 of the reactance device 51 through the color killer circuit 23 so that the correction wave will exist at the control grid 50 of the reactance device 51 only during monochrome transmission and be removed during color operation. This is accomplished, in accordance with the present invention, by applying a suitable waveform, which may conveniently be a negative vertical deflection pulse to a terminal 65 and impressing this wave by means of an isolating resistor 66 on the control electrode 57 to the gain control device 58. This wave is accordingly available in the anode circuit of the color killer tube 58 only during the period when the color killer circuit is rendered conductive in the presence of non-synchronous signals. The correction wave is developed in the anode circuit of the tube 58 and applied therefrom by means of the isolating resistor 67 and the coupling capacitor 68 to the control electrode 50 of the reactance device 51. The vertical deflection pulses are integrated by condenser 55 to produce a sawtooth wave at terminal 15. This sawtooth wave sweeps the control bias through the value of control bias at which the reactance tube will cause the oscillator to oscillate with a frequency of 3.58 mcs. and cause the reference oscillator to be locked in with the burst signal when a burst signal of sufficient amplitude is present.

The color killer circuit provided in accordance with the present invention is therefore effective to render the chrominance signal amplifier circuits ineffective for signal translation in the presence of non-synchronous signals and is effective to maintain the chrominance signal amplifier circuits effective for signal translation in the presence of synchronous signals. This is accomplished by means of a synchronous detector which is used to compare a reference wave from the reference oscillator with a received signal and to provide in the presence of burst signals a control bias for synchronizing the reference oscillator and for maintaining the color killer circuit inoperative. The control bias developed in the absence of synchronous operation is substantially zero and is of such a nature as to permit color killer action and if desired to permit the application of a correction wave to the reactance tube circuit. The correction wave is of such a nature as to sweep the reference oscillator through its normal operating range during a period of time wherein the return to cophasal operation is possible in the event that the processed signals contain color synchronizing bursts. The color killer circuit provided by the present invention is therefore insensitive to noise and amplitude variations and provides a positive color killer action in the presence of signals which are ineffective to provide synchronous operation.

Having thus described the invention, what is claimed is:

1. A color killer for rendering a chrominance channel amplifier effective for signal translation in response to a control signal and comprising in combination, a chrominance signal amplifier having a signal input circuit and a signal output circuit, means for applying a desired signal and a control signal to said input circuit, a gain control circuit, means coupled with said output circuit for separating said control signal from said desired signal, a phase detector, oscillator means for developing a reference wave, means for impressing said separated control signal and said developed reference wave upon said detector to produce a control bias indicative of the presence or absence of said control signal above a predetermined amplitude, means for applying said control bias to said gain control means for adjusting the gain of said signal amplifier to an operative level when said control signal is present and to an inoperative level when said control signal is absent, means for periodically applying pulses to said gain control means to adjust the gain of said signal amplifier to a predetermined level for the duration of said pulses independent of the presence or absence of said control signal, means for applying a correction wave to said gain control circuit, and means coupled between said gain control circuit and said oscillator to sweep said oscillator through a frequency range including that frequency which would provide cophasal operation of said oscillator and said control signal in the presence of said control signal.

2. A color killer for rendering a chrominance channel amplifier effective for signal translation in response to a color signal capable of providing synchronous operation comprising in combination, a chrominance signal amplifier including a signal input circuit and a signal output circuit, means for applying a composite signal wave to said input circuit which in the presence of color information includes recurrent color synchronizing burst signals, gating means coupled with said output circuit for separating said burst signal from said composite wave, a reference color oscillator for providing a reference wave, a phase detector, means for impressing said burst signal and said reference wave upon said phase detector and to said reference wave to provide a control bias having a magnitude directly proportional to the deviation from a predetermined phase relation between said reference wave and said burst signal and having a magnitude substantially different from zero when said burst signal is of an amplitude to provide synchronous operation of said oscillator and having a magnitude of substantially zero when the amplitude of said burst signal is insufficient to provide synchronous operation, a gain control circuit coupled with said input circuit, means for applying said control bias to said gain control means for adjusting the gain of said signal amplifier to an operative level when the level of said control bias is other than zero and to an inoperative level when said control bias is substantially zero, means for applying said control bias to said oscillator for providing cophasal operation when said control bias is other than zero, means for periodically applying pulses to said gain control means to adjust the gain of said signal amplifier to an operative level for the duration of said pulses independent of the magnitude of said control bias, means for applying a correction wave to said gain control circuit, said correction voltage intermittently traversing the value of control bias at which said burst signal and said reference wave are cophasal during the presence of color information, and means for applying said correction wave to said oscillator when said signal amplifier is rendered inoperative to sweep said oscillator through a frequency range including said cophasal operation.

3. A color killer for rendering a signal channel ineffective for signal translation in response to a control signal and comprising in combination: a signal amplifier including a signal input circuit and a signal output circuit, means for applying a composite signal wave to said input circuit which in the presence of color information includes recurrent color synchronizing burst signals having a prescribed phase, a feedback circuit coupled between said input circuit and said output circuit for controlling the gain of said amplifier and including a phase detector, reference wave generator means for applying a reference wave to said phase detector, said reference wave generator having a controllable phase responsive to a control bias applied thereto, means for operatively connecting said phase detector to said reference wave generator means to cause synchronous operation of said reference wave generator means when the phases of said reference wave and said bursts are substantially different from quadrature, means for connecting said phase detector in circuit with said reference wave generator means to provide a first control bias to said reference wave generator means comprising a first voltage whose magnitude is substantially different from zero when said synchronous operation is achieved and a second voltage greater than said first voltage when said reference wave phase deviates from burst phase in one direction and a third voltage smaller than said first voltage when said reference wave phase deviates from said burst phase in a different direction, said phase detector also operative to apply a second control bias of zero amplitude to said reference wave generator means in response to color synchronous bursts having an amplitude insufficient to establish said synchronous operation, means including said feedback circuit to impress first and second control biases upon said amplifier to adjust the gain of said amplifier to an operative level in response to said first control bias and to an inoperative level in response to said second control bias, and means for applying a recurrent pulse to said amplifier to periodically adjust the gain of said amplifier to an operative level independent of said control bias.

4. A color killer for rendering a signal channel ineffective for signal translation in response to a control signal and comprising in combination: a signal amplifier including a signal input circuit and a signal output circuit, means for applying a composite signal wave to said input circuit which in the presence of color information includes recurrent color synchronizing bursts having a prescribed phase, a feedback circuit coupled between said input circuit and said output circuit for controlling the gain of said amplifier in response to a control bias applied thereto and including a phase detector, reference wave generator means for applying a reference wave to said phase detector, said reference wave generator having a controllable phase also responsive to a control bias applied thereto, means for operatively connecting said phase detector to said reference wave generator means to cause synchronous operation of said reference wave generator means when the phases of said reference wave and said bursts are substantially in phase, means for connecting said phase detector in circuit with said reference wave generator means to apply a first control bias to said reference wave generator means comprising a first voltage whose magnitude is substantially different from zero when said synchronous operation is achieved and a second voltage greater than said first votage when said reference wave phase deviates from a first phase near burst phase in one direction and a third voltage smaller than said first voltage when said reference wave phase deviates from said first phase in a different direction, said phase detector also operative to apply a second control bias of zero amplitude to said reference wave generator in response to a composite signal wherein there is an absence of color information being applied to said signal input circuit, means including said feedback circuit to impress first and second control biases upon said amplifier to adjust the gain of said amplifier to an operative level in response to said first control bias within a predetermined amplitude range and to an inoperative level in response to said second control bias, and means for applying a recurrent pulse to said amplifier to periodically adjust the gain of said amplifier to an operative level independent of said control bias.

5. In combination: a first circuit to provide intermittent color synchronizing bursts having prescribed phase and frequency only during color transmission, an oscillator operative to produce oscillations at substantially said prescribed frequency, phase detector means connected between said first circuit and said oscillator and including apparatus to derive a control signal having zero magnitude during other than color transmission and having a first magnitude when said oscillations and said bursts are in a prescribed phase relationship substantially different from a quadrature relationship and having a magnitude in a range of magnitudes greater than said first magnitude when said oscillations deviate from said prescribed phase relationship in a first direction and having a magnitude in a range of magnitudes smaller than said first magnitude when said oscillations deviate from said prescribed relationship in a second direction, frequency control means connected between said oscillator and said phase detector, means for applying said control signal to said frequency control means to pull said oscillator into synchronism at a phase having said phase relationship with respect to said bursts during color transmission, means coupled between said first circuit and said phase detector to disable said first circuit during other than color transmission, means for impressing said control signal upon said disabling means, sawtooth wave generator means coupled to said frequency control means to periodically sweep the phase of said oscillations through a phase corresponding to said prescribed phase relationship during other than color transmission, means for impressing said control signal upon said sawtooth wave generator means.

6. In combination: a first circuit to provide intermittent synchronizing bursts having prescribed phase and frequency only during a first of a plurality of modes of transmission, an oscillator operative to produce oscillations at substantially said prescribed frequency, a reactance tube means coupled to said oscillator and operatively connected therewith to provide phase control of said oscillations responsive to a control signal applied thereto, a phase detector connected between said oscillator and said first circuit and comprising a pair of peak detectors for respectively detecting the peak of said bursts in combination with one phase of said oscillations and the peak of said bursts in combination with an opposite phase of said oscillations, said peak detectors operatively connected to add said detections and to derive a control signal therefrom, said control signal having zero magnitude during other than said first mode of transmission and having a first magnitude when said oscillations and said bursts are in a prescribed phase relationship substantially different from a quadrature relationship and having a magnitude in a range of magnitudes each greater than said first magnitude when said oscillations deviate from said prescribed phase relationship in a first direction and having a magnitude in a range of magnitudes smaller than said first magnitude when said oscillations deviate from said prescribed relationship in a second direction, and means to apply said control signal to said reactance tube means.

7. In combination: a first circuit to provide intermittent synchronizing bursts having prescribed phase and frequency only during a first of a plurality of modes of transmission, an oscillator operative to produce oscillations at substantially said prescribed frequency, a reactance tube means coupled to said oscillator and operatively connected therewith to provide phase control of said oscillations responsive to a control signal applied thereto, a phase detector connected between said oscillator and said first circuit and comprising a pair of peak detectors for respectively detecting the peak of said bursts in combination with one phase of said oscillations and the peak of said bursts in combination with an opposite phase of said oscillations, said peak detectors operatively connected to add said detections and to derive a control signal therefrom, said control signal having zero magnitude during other than said first mode of transmission and having a first magnitude when said oscillations and said bursts are in a prescribed phase relationship substantially different from a quadrature relationship and having a magnitude in a range of magnitudes each greater than said first magnitude when said oscillations deviate from said prescribed phase relationship in a first direction and having a magnitude in a range of magnitudes smaller than said first magnitude when said oscillations deviate from said prescribed relationship in a second direction, and means to apply said control signal to said reactance tube means, an amplifier means, a gain control means coupled to said amplifier means and having an input circuit, said gain control means capable of controlling the gain of said amplifier means responsive to a control signal applied to said input circuit, and means to apply said control signal from said control signal deriving means to said input circuit to reduce the gain of said amplifier means to below a prescribed level when said control signal has zero magnitude.

8. In combination: a chrominance channel amplifier effective for signal translation in response to a color synchronizing burst signal, said chrominance signal amplifier having a signal input circuit and a signal output circuit, and a gain control means, said chrominance signal amplifier capable of having its amplification controlled in accordance with the magnitude of a control bias applied to said gain control means, means for applying a chrominance signal and a color synchronizing burst signal to said input circuit, gating means coupled with said output circuit for separating said burst signal from said chrominance signal, a reference color oscillator for providing a reference wave, a reactance tube coupled to said oscillator in a manner to control the frequency and phase of said oscillator in accordance with the magnitude of a control bias applied thereto, a phase detector responsive to said burst signal and to said reference wave to provide a control bias having a magnitude substantially different from zero and directly proportional to the deviation from a phase relation substantially different from a quadrature relationship between said reference wave and said burst signal and having a magnitude of substantially zero when the amplitude of said burst signal is below a predetermined level, means for applying said burst signal and said reference wave to said phase detector, means for applying said control bias to said gain control means for adjusting the amplification of said chrominance channel amplifier to an operative level when the control bias level is other than zero and to an inoperative level when said control bias is zero, means for applying said control bias to said reactance tube for providing synchronous operation when said control bias is other than zero, and means for periodically applying pulses to said gain control means to adjust the gain of said chrominance channel amplifier to an operative level for the duration of said pulses independent of the presence or absence of said burst signal.

9. Apparatus comprising in combination: a chrominance signal amplifier circuit having a signal input circuit and a signal output circuit, and a gain control means for controlling the gain of said chrominance signal amplifier in accordance with the amplitude of a control bias applied thereto, means for applying a chrominance signal and a color synchronizing burst signal to said input circuit, signal separating means coupled with said output circuit for separating said burst signal from said chrominance signal, a reference color oscillator for providing a reference wave, a phase control means coupled to said color oscillator for controlling the phase of said oscillator in accordance with the magnitude of a control bias applied thereto, a phase detector responsive to said burst signal and to said reference wave to provide a control bias having a magnitude substantially different from zero and directly proportional to the deviation from substantially an in-phase relation between said reference wave and said burst signal and having a magnitude of substantially zero when the amplitude of said burst signal is below a predetermined level, means for impressing said burst signal and said reference wave upon said phase detector, means for applying said control bias to said gain control means for adjusting the gain of said chrominance channel amplifier to an operative level when the control bias level other than zero and to an inoperative level when said control bias is zero, means for applying said control bias to said phase control means for providing cophasal operation when said control bias is other than zero, means for periodically applying pulses to said gain control means to adjust the gain of said chrominance channel amplifier to an operative level for the duration of said pulses independent of the presence or absence of said burst signal, and means for applying a periodic control bias waveform to said phase control means when said chrominance channel amplifier is rendered inoperative to periodically sweep the phase of said oscillator through a phase corresponding substantially to said burst phase when the output of said phase detector is zero.

10. In combination: a chrominance signal amplifier having a signal input circuit and a signal output circuit, means for applying a composite signal including a chrominance signal and a color synchronizing burst signal only during color transmission to said input circuit, gating means coupled with said output circuit for separating said burst signal from said chrominance signal, a reference color oscillator for providing a reference wave, a frequency and phase control means coupled to said oscillator for controlling the frequency and phase of said oscillator in accordance with the magnitude of a control voltage applied thereto, a phase detector responsive to said burst signal and to said reference wave to provide a control bias having a first range of voltages wherein said control bias has a magnitude different from zero and directly proportional to the deviation from a prescribed phase relation substantially different from a quadrature relationship between said reference wave and said burst signal and having a magnitude of substantially zero when said burst signal is absent in said composite signal, means for impressing said burst signal and said reference wave upon said phase detector, a gain control circuit coupled with said input circuit, means for applying said control bias to said gain control means for adjusting the gain of said chrominance channel amplifier to an operative level when the control bias level is other than zero and to an inoperative level when said control bias is zero, means for applying said control bias to said frequency and phase control means for providing cophasal operation when said control bias is other than zero, means for periodically applying pulses to said gain control means to adjust the gain of said chrominance channel amplifier to an operative level for the duration of said pulses independent of the presence or absence of said burst signal, means for applying a first periodic correction waveform to said gain control circuit, said second periodic correction waveform comprising a voltage periodically varying through said first range of voltages, and means coupled between said gain control circuit and said frequency and phase control means for applying a second periodic correction waveform corresponding to said first periodic correction waveform to said frequency and phase control means when said chrominance channel amplifier is rendered inoperative.

11. In combination: a chrominance signal amplifier including a signal input circuit and a signal output circuit, means for applying a composite signal wave to said input circuit which in the presence of color information includes color synchronizing burst signals recurrent at a predetermined periodic rate and occurring during each retrace interval, means coupled with said output circuit for separating said burst signal from said composite wave, a reference color oscillator for providing a reference wave, a frequency and phase control means coupled to said oscillator for controlling the frequency and phase of said oscillator in accordance with the amplitude of a control bias applied thereto, a phase detector responsive to said burst signal and to said reference wave to provide a control bias having a magnitude substantially different from zero and directly proportional to the deviation from a prescribed phase relationship which is substantially different from a quadrature relationship between said reference wave and said burst signal when said burst signal is of an amplitude to provide synchronous operation of said oscillator and having a magnitude of substantially zero when the amplitude of said burst signal is insufficient to provide synchronous operation or is absent in said composite signal wave, means for impressing said burst signal and said reference wave upon said phase detector, a gain control circuit coupled with said signal input circuit, means for applying said control bias to said gain control means for adjusting the gain of said chrominance channel amplifier to an operative level when the level of said control bias is other than zero to an inoperative level when said control bias is substantially zero, means for applying said control bias to said frequency and phase control means to cause said oscillator to be pulled into synchronous operation when said control signal is other than zero, means for applying a pulse to said gain control means during each retrace interval to adjust the gain of said chrominance channel amplifier to an operative level for the duration of said pulses independent of the magnitude of said control bias, means for applying a first correction wave to said gain control circuit, and means coupled between said gain control circuit and said phase and frequency control means for applying a second correction wave derived in said coupling means responsive to said first correction wave to said phase and frequency control means to sweep said oscillator through a frequency range including said cophasal operation when said signal amplifier is rendered inoperative.

12. In a color television receiver adapted to receive a monochrome television signal and a color television signal having a chrominance signal component and a color synchronizing burst component, a chrominance channel amplifier effective to amplify said chrominance signal component, a color killer circuit coupled with said chrominance channel amplifier and operative in response to a control signal to disable said chrominance channel to prevent the amplification of said chrominance signal component, means providing a reference signal having a frequency and phase adapted to be synchronized with the frequency and phase of said burst component, a phase detector circuit including an output terminal and consisting of a pair of diode rectifiers, means for applying said burst component to said phase detector circuit, means for applying said reference signal in one phase to one of said diode rectifiers, means for applying said reference signal in an opposite phase to the other of said diode rectifiers, means connecting said diode rectifiers to provide a control signal of predetermined magnitude at said output terminal for a predetermined phase relation between said reference signal and said burst component and a control signal of different magnitude when said reference signal and said burst component depart from said predetermined phase relation, and means coupling said output terminal with said color killer circuit to impress said control signal upon said color killer circuit to disable said chrominance channel amplifier when said control signal is of said predetermined magnitude.

13. In a color television receiver adapted to receive a monochrome television signal and a color television signal having a chrominance signal component and a burst component, a chrominance channel amplifier operative to provide amplification of said chrominance signal component, signal generator means providing an oscillatory signal of a frequency and phase for synchronization with said burst component, phase control means coupled with said signal generator means, a phase detector circuit including an output terminal and consisting of a pair of diode rectifiers connected to provide a predetermined control signal at said output terminal in response to the application thereto of a synchronous burst component and oscillatory signal and a different control signal in response to a nonsynchronous burst component and oscillatory signal, means for impressing said burst component and said oscillatory signal upon said phase detector circuit, and means coupling said output terminal with said chrominance channel amplifier to impress said control signal upon said amplifier to prevent the amplification thereby of said chrominance signal component for nonsynchronous burst components and oscillatory signals and with said phase control means to provide phase control of said signal generator means in accordance with the phase relation between said oscillatory signal and said burst component.

14. In a color television receiver for reproducing a color image upon reception of a color television signal having a chrominance signal component and a burst component and for reproducing a monochrome image upon reception of a monochrome signal lacking said burst component, amplifier means connected to amplify said chrominance signal component, signal generator means providing a reference oscillatory signal related in frequency to said burst component, phase control means coupled with said signal generator means, a phase detector circuit consisting of a pair of diode rectifiers, means for applying said burst component to said phase detector circuit, means for applying said oscillatory signal to said phase detector circuit, means connecting said diode rectifiers to provide a control voltage of predetermined magnitude for a predetermined phase relation between said reference signal and said burst component and a control voltage of different magnitude when said burst component and said oscillatory signal depart from said predetermined phase relation, means coupling said phase detector with said phase control means to provide synchronous operation of said signal generator means in response to a control voltage of said predetermined magnitude, and means utilizing said control voltages to control the amplification of said chrominance signal component by said amplifier means.

15. In a color television receiver for reproducing a color image upon reception of a color television signal having a chrominance signal component and a burst component and for reproducing a monochrome image upon reception of a monochrome signal lacking said burst component, signal generator means providing a reference oscillatory signal related in frequency to said burst component, a chrominance signal amplifier for amplifying said chrominance signal component, a color killer circuit coupled with said chrominance signal amplifer, a phase detector circuit including an output terminal and consisting of a pair of diode rectifiers, means for applying said oscillatory signal to said phase detector circuit, means for applying said burst component to said phase detector circuit, means connecting said diode rectifiers to provide a control voltage of predetermined magnitude at said output terminal when said oscillatory signal and burst component are in predetermined phase relation and to provide a control voltage of different magnitude at said output terminal when said oscillatory signal and said burst component are non-synchronous, means coupling said output terminal with said color killer circuit to enable said color killer circuit and to disable said chrominance signal amplifier in response to said control voltage of different magnitude, and means utilizing said control voltages to synchronize the operation of said signal generator means.

16. In a color television receiver adapted to receive a monochrome television signal and a color television signal having a chrominance signal component and a burst component, a chrominance channel amplifier operative to provide amplification of said chrominance signal component, a color killer circuit coupled with said chrominance channel amplifier, signal generator means providing an oscillatory signal of a frequency and phase for synchronization with said burst component, phase control means coupled with said signal generator means, a phase detector circuit including an output terminal and consisting of a pair of diode rectifiers connected to provide a control signal at said output terminal in response to the application of said burst component and said oscillatory signal thereto, said control voltage having a magnitude in accordance with the phase relation of said burst component and said oscillatory signal, means for impressing said burst component and said oscillatory signal upon said phase detector circuit, means coupling said output terminal with said color killer circuit to provide control of said chrominance channel amplifier in accordance with the phase relation of said burst component and said oscillatory signal, and means coupling said output terminal with said phase control means to provide phase control of said signal generator means in accordance with the phase relation of said oscillatory signal and said burst component.

17. In a color television receiver for reproducing a color image upon reception of a color television signal having a chrominance signal component and a burst component and for reproducing a monochrome image upon reception of a monochrome signal lacking said burst component, signal amplifier means for amplifying said chrominance signal component, control means connected with said amplifier means, signal generator means providing a reference oscillatory signal related in frequency to said burst component, a phase detector circuit including an output terminal and consisting of a pair of diode rectifiers, means for applying said burst component to said phase detector circuit, means for applying said oscillatory signal to said phase detector circuit, means connecting said diode rectifiers to provide a control voltage of predetermined magnitude at said output terminal when said burst component and said oscillatory signal are in phase and a control voltage of different magnitude when said burst component and said oscillatory signal are nonsynchronous, means coupling said output terminal with said control means to prevent amplification of said chrominance signal component by said signal amplifier means in response to said control voltage of different magnitude, and means coupling said output terminal with said signal generator means to provide synchronous operation thereof.

References Cited in the file of this patent

UNITED STATES PATENTS 2,681,379 Schroeder ------------- June 15, 1954

OTHER REFERENCES

Introduction to Color Television, Admiral Corporation, Chicago, Illinois, February 1954.

RCA Color Television Receiver, Model CT-100, 1954, pages 31 to 34, Circuit Diagram.